(12) United States Patent
Garces et al.

(10) Patent No.: US 6,278,623 B1
(45) Date of Patent: Aug. 21, 2001

(54) SYSTEM AND METHOD FOR COMPENSATING FOR VOLTAGE NOTCHES IN TWO-PHASE PHASE LOCKED LOOPS

(75) Inventors: Luis Jose Garces, Niskayuna; Vinod John; Peter Claudius Sanza, both of Schenectady; Paul Michael Szczesny, Ballston Lake, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/704,246

(22) Filed: Nov. 2, 2000

(51) Int. Cl.[7] ........................................... H02M 1/12
(52) U.S. Cl. .............. 363/46; 363/87; 363/148; 388/911; 388/917
(58) Field of Search .................... 363/44, 46, 39, 363/87, 148, 149; 388/911, 917

(56) References Cited

U.S. PATENT DOCUMENTS

| | | |
|---|---|---|
| 4,201,936 | 5/1980 | Roumanis . |
| 4,399,395 | 8/1983 | Espelage . |
| 4,446,512 | 5/1984 | Jarvinen . |
| 4,499,534 | 2/1985 | Schnetzka et al. . |
| 4,763,059 * | 8/1988 | Espelage et al. . |
| 4,797,802 | 1/1989 | Ng et al. . |
| 5,731,965 | 3/1998 | Cheng . |
| 6,038,152 * | 3/2000 | Baker ................................. 363/89 |
| 6,046,917 | 4/2000 | Gibbs et al. . |

\* cited by examiner

*Primary Examiner*—Shawn Riley
(74) *Attorney, Agent, or Firm*—Jill Breedlove; Robin C. Clark; Hunton & Williams

(57) ABSTRACT

A method and system for compensating for voltage notches in phase locked loop (PLL) control devices. A bridge firing controller receives signals representative of two of the line to line voltages received by the bridge. The controller includes a PLL synchronizing tool which receives the line to line voltage signals and generates a synchronizing phase error signal for aligning the phases of the two input signals. The controller, for a predetermined period following bridge firing, determines whether a voltage notch has occurred. If so, the controller substitutes model control signals for actual control signals so as to reduce the effect of the notch on the generated phase error signal used for synchronization. If not, the controller continues to use the actual control signals to generate the phase error signal. Once the predetermined period has expired, the controller utilizes the actual control signals to generate the phase error signal.

16 Claims, 4 Drawing Sheets

SYSTEM AND METHOD FOR COMPENSATING FOR VOLTAGE NOTCHES IN TWO-PHASE PHASE LOCKED LOOPS

BACKGROUND OF THE INVENTION

The present invention relates generally to devices and systems for controlling and regulating the conversion of power from an AC source to a load, typically a DC motor. More particularly, the present invention relates to devices which control the conduction of controllable rectifier, e.g., thyristor, bridges placed between the source and the motor and, in particular, methods for compensating for inaccuracies caused by voltage notches during bridge commutation.

Motor control systems of the type described above typically include at least one rectifier bridge connecting the motor windings to alternating voltage supply lines. For a conventional three phase motor, each AC phase line is generally coupled to the motor by a pair of connected thyristors. That is, in a three phase system, six thyristors are required to transfer power from the source to the load, each for one half of each phase. A thyristor, such as a silicon controlled rectifier (SCR), is generally defined as a switchable diode controlled by a gate element. Each thyristor presents a relatively high blocking impedance to the flow of electrical energy until it is forward biased by a trigger current being applied to its gate element. A digital control circuit typically determines the proper time to trigger the thryistors during each half-cycle of the supply line voltage. Once a thyristor is triggered by the application of a predetermined current to its gate, the forward blocking impedance is lowered, thereby permitting the flow of electrical energy through the thyristor in the manner of a diode. Once conduction has been enabled, the thyristor cannot be turned off until the current flowing therethrough is reduced to near zero (i.e., makes a zero crossing).

The amount of power transferred to the motor is controlled by varying the duration of the conduction of the various thyristors. This is done by controlling the firing angle of each thyristor, that is, the point in the AC waveform at which the thyristor is initiated into conduction. The process of switching from thyristor to thyristor is known as commutation.

Generally, in a polyphase system, all of the line current is carried by a particular phase or thyristor at a given point in time. However, since the commutation of current from one thyristor cell to the next takes both time and voltage, during commutation, two consecutive cells become shorted for the time it takes to commute the line current from the outgoing cell to the oncoming cell. The duration of this short is related to both the commutation inductance (the inductance of the source supplying the bridge) and the amplitude of the current being commutated. As a result, the typically sinusoidal AC line to line voltage becomes corrupted by periods of zero voltage caused by the cell shorting. These disturbance periods are commonly referred to as voltage notches. Since six thyristors are fired during each cycle, six voltage notches appear in each of the line to line voltage signals every cycle.

In order to control the firing of the various thyristors, conventional systems incorporate a firing controller, either analog or digital, to control the firing angle of each thyristor. The line to line voltages described above are generally used by the controller in conjunction with a phase lock loop (PLL) to synchronize the phases of each of the received line to line voltages and to thereby accurately determine the proper thyristor firing angles. The above-described voltage notches in each of the line to line voltage signals introduce deleterious effects to the accuracy and stability of the PLL and the firing controller.

U.S. Pat. No. 4,399395 issued to Paul M. Espelage recognizes problems caused by voltage notches and discloses a method for compensating therefor wherein a synchronizing pulse train is generated from a composite waveform developed by summing at least one line to line voltage signals containing the voltage notches and a signal corresponding to at least one delta current derived from the difference of two phase currents and multiplied by a factor representative of the commutation inductance. Unfortunately, this method fails to efficiently and accurately compensate for such effects with a minimum of complexity and increased cost.

Accordingly, there is a need in the art of power control systems for a system and method for accurately compensating for the effects of voltage notches without increasing the cost or complexity of the system.

BRIEF SUMMARY OF THE INVENTION

The present invention overcomes the problems noted above, and provides additional advantages, by providing for a method and system for compensating for voltage notches in phase locked loop (PLL) control devices. A bridge firing controller receives signals representative of two of the line to line voltages received by the bridge. The controller includes a PLL synchronizing tool which receives the line to line voltage signals and generates a synchronizing phase error signal for aligning the phases of the two input signals. The controller, for a predetermined period following bridge firing, determines whether a voltage notch has occurred. If so, the controller substitutes model control signals for actual control signals so as to reduce the effect of the notch on the generated phase error signal used for synchronization. If not, the controller continues to use the actual control signals to generate the phase error signal. Once the predetermined period has expired, the controller utilizes the actual control signals to generate the phase error signal.

By substituting model signals for actual signals during voltage notches, the effects of the voltage notches are compensated, thereby enabling the use of previously unstable high gain proportional plus integral controllers having decreased susceptibility to phase error losses and providing for more accurate operation of the thyristor bridge.

BRIEF DESCRIPTION OF THE DRAWINGS

The present invention can be understood more completely by reading the following Detailed Description of exemplary embodiments, in conjunction with the accompanying drawings, in which.

DETAILED DESCRIPTION OF THE INVENTION

Figure 1:
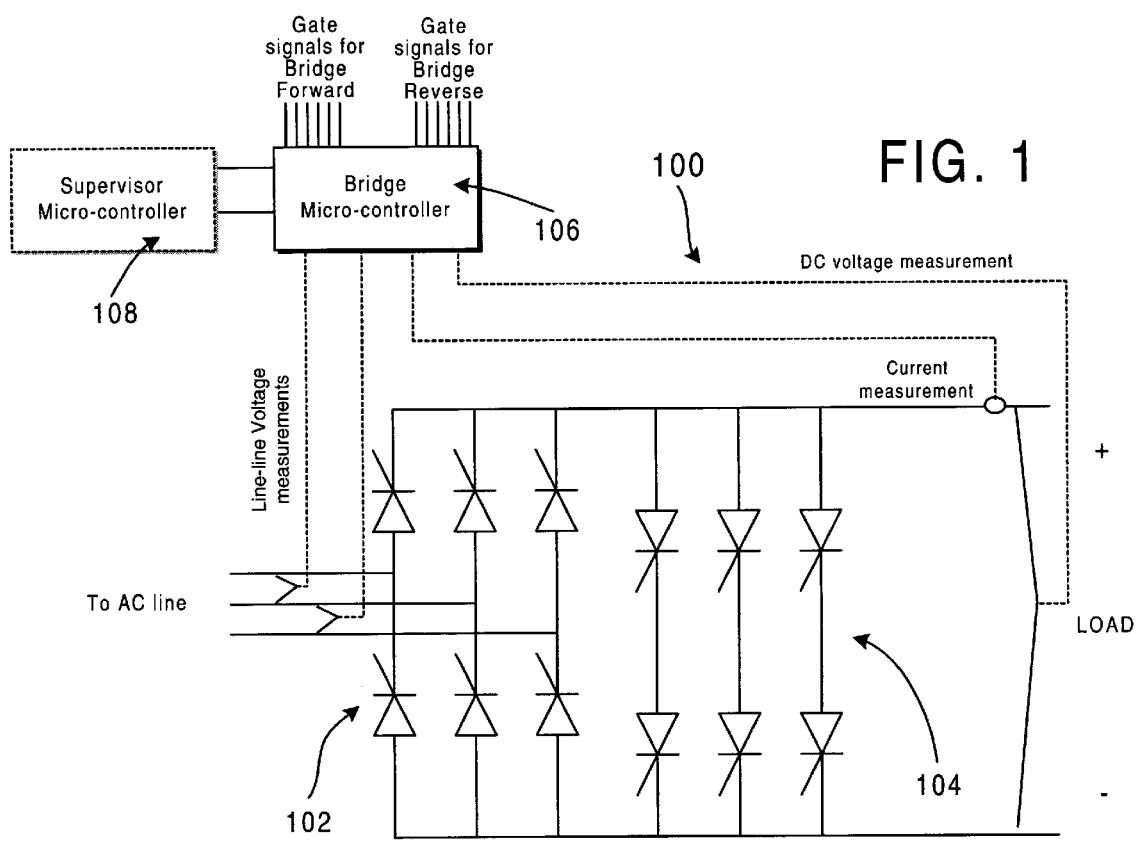
FIG. 1 is a basic block diagram illustrating a thyristor bridge and firing controller system incorporating the method of the present invention.

Referring to the Figures and, in particular, to FIG. 1, there is shown a block diagram illustrating one embodiment of a power conversion apparatus incorporating the voltage notch compensation system of the present invention. In particular, forward and reversing thyristor bridges 102 and 104 are connected between an AC source (either a single or a polyphase source) and a load in the manner described above. Bridge firing controller 106 and supervisor controller 108 are electronically connected to the system for controlling the firing of the bridges 102 and 104. In accordance with one embodiment of the present invention, the bridge firing controller 106 receives signals from the system indicative of the bridge output voltage, the load current, and the line to line input voltages. Further, the bridge firing controller also receives signals indicative of the gate signals applied to each thryristor in bridges 102 and 104. In the manner set forth in detail below, the bridge firing control utilizes these signals to accurately and quickly enable safe and effective transfer of power from the source to load or, in a reversing mode, from the load to the source. It should be understood that although the above described system has been illustrated to include a thyristor bridge for use in controlling a DC motor, the present invention may also be utilized in the control of cycloconverters feeding AC motors, in SCR bridges used for load commutated inverters, and in other similarly controlled rectifier bridges.

Preferably, the bridge firing controller 106 is a digital micro-controller incorporating a two-phase phase locked loop (PLL) and a proportional plus integral (PI) controller for synchronizing the two input line to line voltages received by the bridge. Unfortunately PI controllers suffer from problems which adversely effect their ability to accurately follow phase and frequency changes in the input signals. In particular, if the PI incorporated into the controller is tuned with a low gain, the PI may be unable to react quickly enough to changes in phase and frequency, thus leading to a phase error between the input voltage and the angle $\gamma_{PLL}$. These phase errors limit the bandwidth and linearity of the thyristor bridge, and force the outer regulator loops to compensate therefor. Conversely, to overcome the deficiencies of low gain PI controllers, a high gain PI controller may be used to enable quick reaction to changes in phase and frequency. However, as set forth above, high gain PI's are susceptible to disturbances caused by voltage notches in the line to line voltage signals. Accordingly, the bridge firing controller 108 generates model signals related to the input line to line voltages, wherein during voltage notch conditions, the model signals may be used in place of the actually measured signals, thereby permitting the use of high gain PI controllers and increasing the ability of the controller to accurately and efficiently control the firing of the thyristor bridge.

Figure 2:
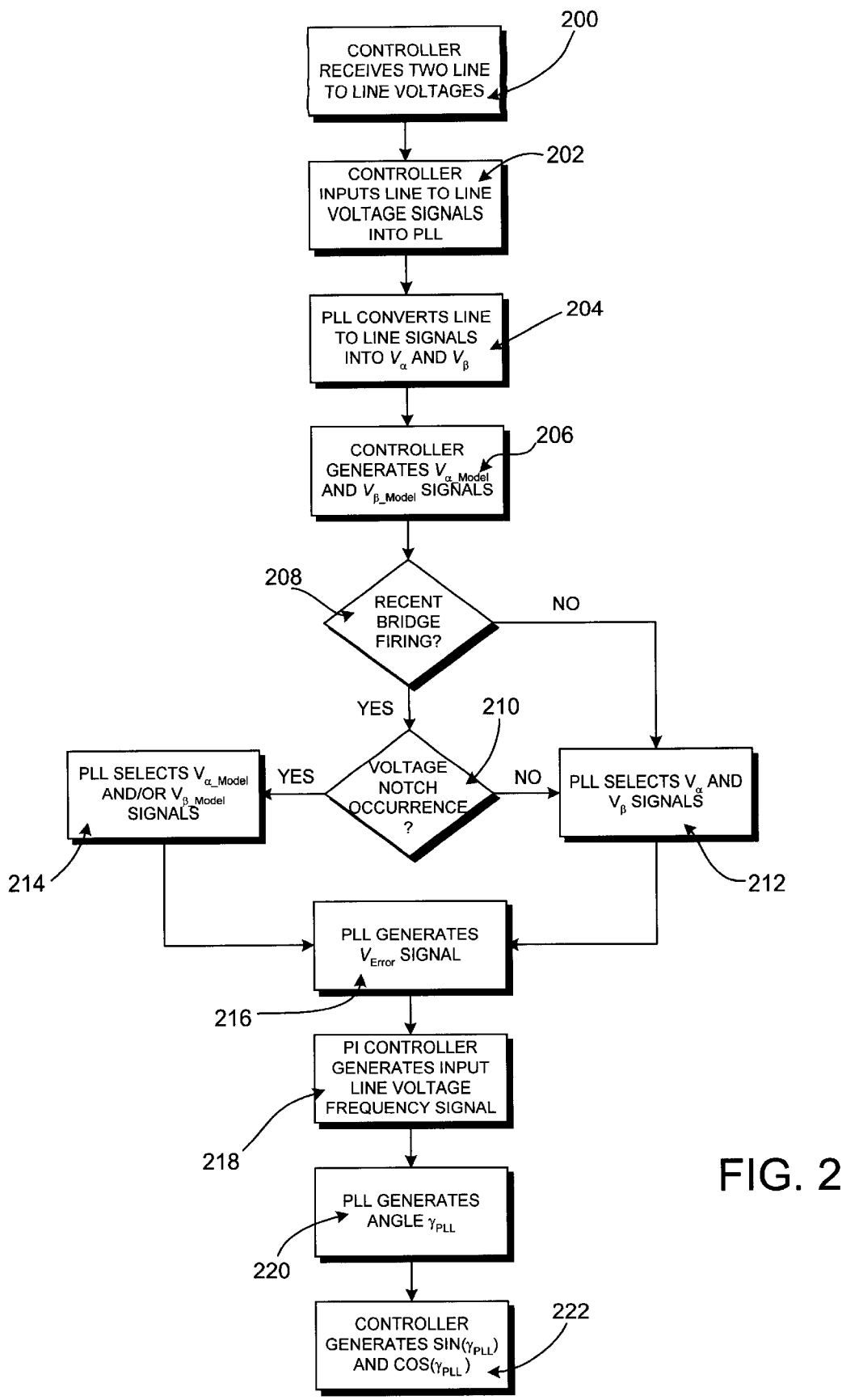
FIG. 2 is a flow chart describing a method for compensating for voltage notches in a phase locked loop.

Referring now to FIG. 2, there is shown a flow chart describing one embodiment of a method for compensating for voltage notches in a thyristor bridge firing controller. As is known in the art, a controller for regulating the firing of thyristors in a thyristor bridge necessarily receives phase information relating to the line voltage which the bridge is presently conducting in order to align the firing impulses to the line to line voltage. In accordance with one embodiment of the present invention, the bridge firing controller 108, in step 200, receives two of the AC line to line voltage signals $V_{ab}$ and $V_{ca}$, phase shifted from the other by 120°. Mathematically, the signals $V_a$, $V_b$, $V_c$, $V_{ab}$, and $V_{ca}$ can be expressed using the following expressions:

$$V_a = V_{Mag} * \sin(\gamma_{line});$$

$$V_b = V_{Mag} * \sin\left(\gamma_{line} + \frac{2*\pi}{3}\right);$$

$$V_c = V_{Mag} * \sin\left(\gamma_{line} - \frac{2*\pi}{3}\right);$$

$$V_{ab} = V_{Peak} * \sin(\omega * t);$$

$$V_{ca} = V_{Peak} * \sin\left(\omega * t + \frac{2*\pi}{3}\right);$$

where $$\gamma_{line} = \int_o^t \omega_{line} \, dt,$$

$\omega_{line} = 2*\pi*\text{linefrequency}$, $\omega*t = \gamma_{input}$, and $$\frac{2*\pi}{3}$$

is 120 electrical degrees.

In step 202, the controller inputs the line to line voltage signals ($V_{ab}$, $V_{ca}$) into a two-phase phase locked loop (PLL) synchronizing tool incorporated into the controller. In step 204, the PLL, through coordinate transformation, converts the input line to line voltage signals into two sine wave signals ($V_\alpha$, $V_\beta$) having the same amplitude ($V_{Mag}$), but 90° out of phase. The two-phase PLL also generates an angle $\gamma_{PLL}$ that corresponds to the input angle $\gamma_{input}$, if the PLL is working correctly and is locked to the input voltage. This angle $\gamma_{PLL}$ is then used by the controller in the conventional manner to define the time for the cell firing. The above calculations are described mathematically in the following manner:

Since $V_\alpha$ and $V_\beta$ have the same amplitude but are 90° out of phase, they can be re-written as:

$$V_\alpha = V_{Mag} * \sin(\gamma_{line});$$

$$V_\beta = V_{Mag} * \sin(\gamma_{line}); \text{ and}$$

$$V_{Mag} = \sqrt{V_\alpha^2 - V_\beta^2},$$

where $V_{Mag}$ is the amplitude of the converted line to line voltages, as measured by the controller.

In order to increase the accuracy of the phase synchronization during voltage notch disturbances, the PLL, in step 206 also generates a time-corrected model for each of the voltage signals $V_\alpha$ and $V_\beta$ referred to as $V_{\alpha\_Model}$ and $V_{\beta\_Model}$. $V_{\alpha\_Model}$ and $V_{\beta Model}$ are based upon the sine-cosine signal of the PLL and the amplitude $V_{Mag}$, in accordance with the following expressions:

$$V_{\alpha\_Model} = V_{Mag} * \sin(\gamma_{PLL} + \omega_{PLL} * \Delta t), \text{ and}$$

$$V_{\beta\_Model} = V_{Mag} * \cos(\gamma_{PLL} + \omega_{PLL} * \Delta t),$$

where $\omega_{PLL} * \Delta t$ represents a phase advance of one controller sampling time at the last calculated frequency of the PLL.

In step 208, the controller determines whether a bridge firing has recently been commanded (preferably within the last 5 samplings or approximately 1250 μs, where the controller sampling time is 250 μs). If a bridge firing has not been recently commanded, the controller assumes that no voltage notches are present and continues to step 212, described below, wherein the PLL selects the measured values of $V_\alpha$ and $V_\beta$ for phase error calculation. If the controller determines that a bridge firing has recently been commanded, the PLL, in step 210, determines whether a voltage notch disturbance is occurring by determining whether the quantity $|(V_\alpha - V_{\alpha\_Model})|$ is less than a predetermined percentage of $V_{Mag}$ (preferably, around 10%). If so, the controller determines that a voltage notch is not occurring and proceeds to step 212, wherein the PLL uses the measured value of $V_\alpha$ for phase error calculation. However, if, $|(V_\alpha - V_{\alpha\_Model})|$ is greater than the predetermined percentage of $V_{Mag}$, the controller proceeds to step 214, where it selects the model value $V_{\alpha\_Model}$ for phase error calculation.

A similar procedure is simultaneously followed for $V_\beta$. If $|(V_\beta - V_{\beta\_Model})|$ is less than a predermined percentage of $V_{Mag}$ (preferably, around 10%), the controller selects the measured value $V_\beta$ for phase error calculation. However, if $|(V_\beta - V_{\beta\_Model})|$ is greater than the predetermined valued of $V_{Mag}$ (preferably, around 10%), the controller selects the model value $V_{\beta\_Model}$ for phase error calculation.

In step 216, the PLL utilizes the set of signals selected in steps 212 or 214 and generates a phase error signal $V_{Error}$ which is proportional to the sine of the angle difference between the two sets of orthogonal quantities (i.e., $\gamma_{line} - \gamma_{PLL}$), according to the expression:

$$V_{Error} = (V_\alpha * \cos(\gamma_{PLL}) - V_\beta * \sin(\gamma_{PLL}))$$

$$= V_{Mag} * \sin(\gamma_{line} - \gamma_{PLL})$$

wherein all variables are as set forth above. Note that where $V_{\alpha\_Model}$ and $V_{\beta\_Model}$ have been selected in step 214, $V_\alpha$ and $V_\beta$ are replaced therewith.

Preferably, the phase error signal $V_{Error}$ is regulated to zero using a proportional plus integral (PI) controller. The PI controller, in step 218, generates a signal corresponding to the frequency of the input line voltage. This signal is then integrated in step 220 to generate the angle $\gamma_{PLL}$. This angle $\gamma_{PLL}$ is then used in step 222 to generate the two orthogonal sine and cosine signals of the phase angle $\gamma_{PLL}$. In this manner, the PLL can follow the phase and frequency changes of the input line provided that the bandwidth of the closed loop is wide enough to follow.

By selectively determining the existence of voltage notches caused by cell commutation effects and calculating the phase error signal based upon model voltages during the effect, the inventive controller effectively smooths out the disturbances, thereby increasing the accuracy of the phase error calculation.

Figure 3:
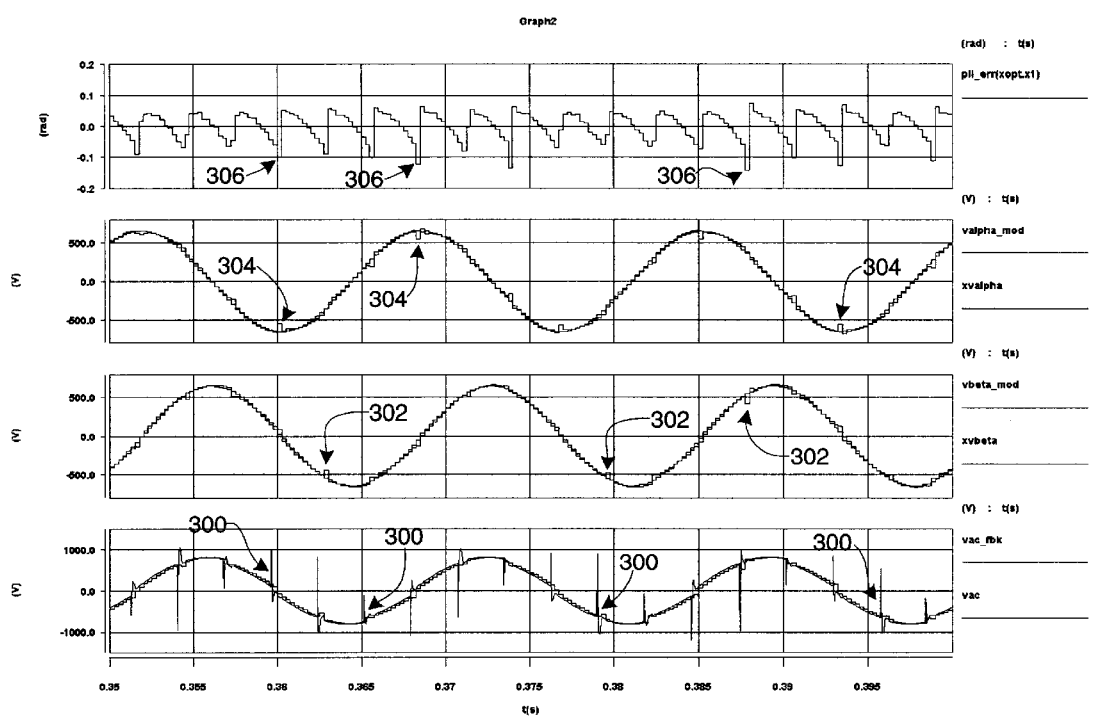
FIG. 3 is an exemplary graph of phase error, $V_\alpha$, $V_{\beta\_model}$, $V_\beta$, $V_{\beta\_model}$, $V_{ac}$, and $V_{ac\_Fbk}$ signals all against time illustrating uncompensated voltage notches and their effects.
Figure 4:
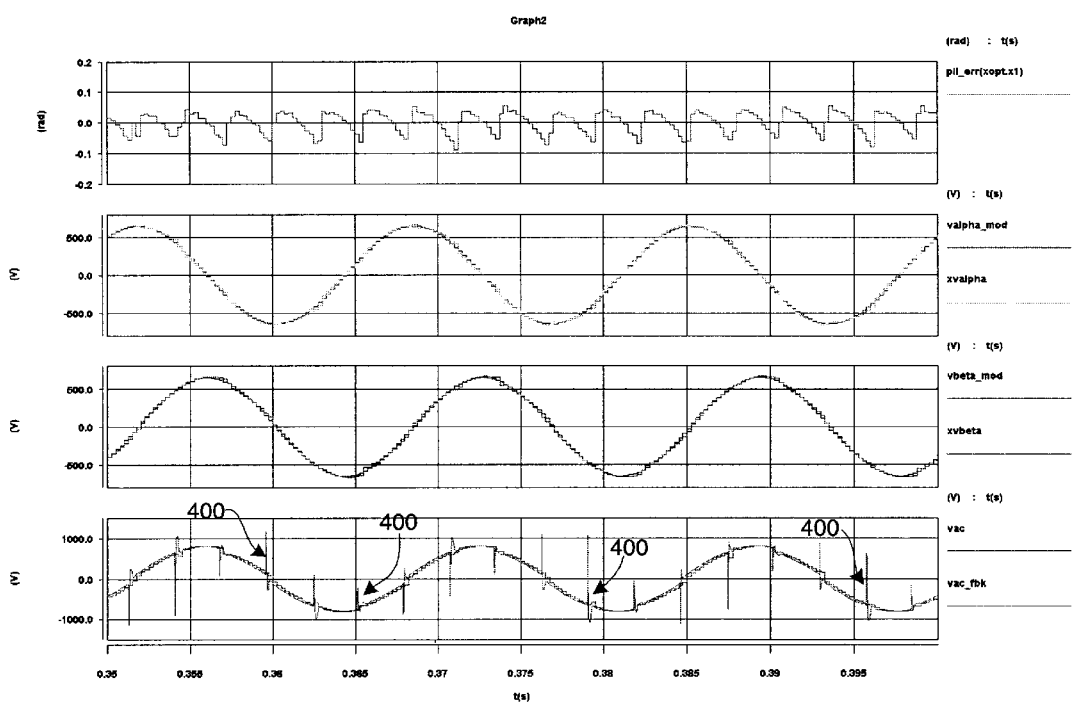
FIG. 4 is an exemplary graph similar to FIG. 3 showing phase error, $V_\alpha$, $V_{\alpha\_model}$, $V_\beta$, $V_{\beta\_model}$, $V_{ac}$, and $V_{ac\_Fbk}$ signals all against time wherein the voltage notches in the signals have been compensated in accordance with one embodiment of the present invention.

Referring now to FIGS. 3 and 4, there are shown four channels containing exemplary graphs illustrating each of the signals ph_error, $V_\alpha$, $V_{\alpha\_model}$, $V_\beta$, $V_{\beta\_model}$, $V_{ac}$, and $V_{ac\_Fbk}$ against time for both an uncompensated system wherein voltage notches adversely effect PLL performance (FIG. 3) and a system compensated in accordance with the method set forth above wherein the effects of the voltage notches have been reduced (FIG. 4). In particular, the $V_{ac}$ and $V_{ac\_Fbk}$ signals, shown in channel 1 of both FIG. 3 and FIG. 4, represent the analog and sampled line to line voltage signals received by the PLL. The $V_\alpha$ and $V_{\alpha\_model}$ signals shown in channel 3 as well as the $V_\beta$ and $V_{\beta\_model}$ signals shown in channel 3 are generated by the PLL. The ph_error signal also generated by the PLL is shown in channel 4.

Referring in particular to channel 1 of FIG. 3, there can be seen voltage notch effects to the line to line voltage signal designated by the numeral 300 caused by brief short circuits during the firing of successive thyristors. Please note that 6 discrete voltage notches 300 appear during each firing cycle. As described above, these voltage notches cause disturbances and inaccuracies 302, 304 and 306 in the measurement of $V_\alpha$, $V_\beta$ and the synchronizing ph_error signals, respectively, each generated by the PLL as shown in channels 2–4 of FIG. 3.

Referring now to FIG. 4, voltage notch effects 400 in the line to line voltage signals $V_{ac}$ and $V_{ac\_Fbk}$ are shown in channel 1 and are similar to those shown in FIG. 3 and described above. However, unlike the signals shown in FIG. 3, the above-described method for compensating for these notches has been applied to the FIG. 4 signals by the PLL thereby resulting in significantly reduced voltage notch effects in each of the $V_\alpha$, $V_\beta$ and phase_error signals shown in channels 2–4.

By compensating for the effects of voltage notches caused by thyristor cell commutation in phase locked loops, the method of the present invention provides for more accurate operation of a thyristor bridge, thereby enabling the use of previously unstable high gain proportional plus integral controllers having decreased susceptibility to phase error losses.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

We claim:

1. A method for compensating for voltage notches in a thyristor bridge firing controller comprising the steps of:

periodically receiving, at a predetermined controller sampling rate, a plurality of line to line voltage signals;

converting said plurality of line to line voltage signals into orthogonal signals $V_\alpha$ and $V_\beta$;

generating model signals $V_{\alpha\_Model}$ and $V_{\beta\_Model}$ based upon said orthogonal signals $V_\alpha$ and $V_\beta$;

determining whether a bridge firing has been recently commanded;

determining whether a voltage notch disturbance is occurring if it is determined that a bridge firing has been recently commanded; and generating a phase error signal based upon $V_{\alpha\_Model}$ and/or $V_{\beta\_Model}$ if it is determined that a voltage notch disturbance is occurring.

2. The method of claim 1, further comprising the steps of:

determining if $|(V_\alpha - V_{\alpha\_Model})|$ and $|(V_\beta - V_{\beta\_Model})|$ are each greater than a predetermined value if it is determined that a bridge firing has been recently commanded;

generating a phase error signal based upon $V_\alpha$ and $V_\beta$ if it is determined that either a bridge firing has not been recently commanded or that $|(V_\alpha - V_{\alpha\_Model})|$ and $|(V_\beta - V_{\beta\_Model})|$ are not greater than said predetermined value;

generating a compensated phase error signal based upon $V_{\alpha\_Model}$ if it is determined that $|(V_\alpha - V_{\alpha\_Model})|$ is greater than said predetermined value; and generating said compensated phase error signal based upon $V_{\beta\_Model}$ if it is determined that $|(V_\beta - V_{\beta\_Model})|$ is greater than said predetermined value.

3. The method of claim 2, wherein said predetermined value corresponds to a predetermined percentage of $V_{Mag}$, wherein $V_{Mag}$ is the amplitude of $V_\alpha$ and $V_\beta$.

4. The method of claim 3, wherein said predetermined percentage is equal to approximately 10%.

5. The method of claim 1, wherein $V_{\alpha\_Model}$ and $V_{\beta\_Model}$ are calculated based upon the following expressions:

$$V_{\alpha\_Model} = V_{Mag}*\sin(\gamma_{PLL}+\gamma_{PLL}*\Delta t), \text{ and}$$

$$V_{\beta\_Model} = V_{Mag}*\cos(\gamma_{PLL}+\gamma_{PLL}*\Delta t)$$

wherein $V_{Mag}$ is the amplitude of $V_\alpha$ and $V_\beta$, $\gamma_{PLL}$ is a controller generated angle, and $\omega_{PLL}*\Delta t$ represents a phase advance of one controller sampling time at the last calculated frequency of the controller.

6. The method of claim 1, further comprising to steps of:
determining whether a bridge firing has been commanded with five sampling periods.

7. The method of claim 4, wherein five sampling periods is approximately 1250 μs.

8. A method for compensating for voltage notches in a thyristor bridge firing controller comprising the steps of:
periodically receiving, at a predetermined controller sampling rate, a plurality of line to line voltage signals;
converting said plurality of line to line voltage signals into orthogonal signals $V_\alpha$ and $V_\beta$;
generating model signals $V_{\alpha\_Model}$ and $V_{\beta\_Model}$ based upon said orthogonal signals $V_\alpha$ and $V_\beta$, wherein $V_{\alpha\_Model}$ and $V_{\beta\_Model}$ are calculated based upon the following expressions:

$$V_{\alpha\_Model} = V_{Mag}*\sin(\gamma_{PLL}+\omega_{PLL}*\Delta t), \text{ and}$$

$$V_{\beta\_Model} = V_{Mag}*\cos(\gamma_{PLL}+\omega_{PLL}*\Delta t),$$

wherein $V_{Mag}$ is the amplitude of $V_\alpha$ and $V_\beta$, $\gamma_{PLL}$ is a controller generated angle, and $\omega_{PLL}*\Delta t$ represents a phase advance of one controller sampling time at the last calculated frequency of the controller;
determining whether a bridge firing has been recently commanded;
determining if $|(V_\alpha-V_{\alpha\_Model})|$ and $|(V_\beta-V_{\beta\_Model})|$ are each greater than a predetermined value if it is determined that a bridge firing has been recently commanded;
generating a phase error signal based upon $V_{60}$ and $V_\beta$ if it is determined that either a bridge firing has not been recently commanded or that $|(V_\alpha-V_{\alpha\_Model})|$ and $|(V_\beta-V_{\beta\_Model})|$ are not greater than said predetermined value;
generating a compensated phase error signal based upon $V_{\alpha\_Model}$ if it is determined that $|(V_\alpha-V_{\alpha\_Model})|$ is greater than said predetermined value; and
generating said compensated phase error signal based upon $V_{\beta\_Model}$ if it is determined that $|(V_\beta-V_{\beta\_Model})|$ is greater than said predetermined value.

9. A controller for regulating the firing of a thyristor bridge comprising:
a plurality of inputs for receiving a plurality of line to line voltage signals;
a two-phase phase locked loop electrically connected to said plurality of inputs,
wherein said two-phase phase locked loop converts said plurality of line to line voltage signals into orthogonal signals $V_\alpha$ and $V_\beta$, wherein said two-phase phase locked loop further generates model signals $V_{\alpha\_Model}$ and $V_{\beta\_Model}$;
first determining means for determining whether a bridge firing has been recently commanded;
second determining means for determining whether a voltage notch disturbance is occurring if it is determined by said first determining means that a bridge firing has been recently commanded; and
generating means for generating a phase error signal based upon $V_{\alpha\_Model}$ and/or $V_{\beta\_Model}$ if it is determined that a voltage notch disturbance is occurring.

10. The controller of claim 9, wherein:
said second determining means determine if $|(V_\alpha-V_{\alpha\_Model})|$ and $|(V_\beta-V_{\beta\_Model})|$ are each greater than a predetermined value if it is determined by said first determining means that a bridge firing has been recently commanded;
said generating means generate a phase error signal based upon $V_\alpha$ and $V_\beta$ if it is determined by said first and second determining means that either a bridge firing has not been recently commanded or that $|(V_\alpha-V_{\alpha\_Model})|$ and $|(V_\beta-V_{\beta\_Model})|$ are not greater than said predetermined value;
said generating means generate a compensated phase error signal based upon $V_{\alpha\_Model}$ if it is determined by said second determining means that $|(V_\alpha-V_{\alpha\_Model})|$ is greater than said predetermined value; and
said generating means generate said compensated phase error signal based upon $V_{\beta\_Model}$ if it is determined by said second determining means that $|(V_\beta-V_{\beta\_Model})|$ is greater than said predetermined value.

11. The controller of claim 10, wherein said predetermined value corresponds to a predetermined percentage of $V_{Mag}$, wherein $V_{Mag}$ is the amplitude of $V_\alpha$ and $V_\beta$.

12. The controller of claim 11, wherein said predetermined percentage is equal to approximately 10%.

13. The controller of claim 9, wherein $V_{\alpha\_Model}$ and $V_{\beta\_Model}$ are calculated based upon the following expressions:

$$V_{\alpha\_Model} = V_{Mag}*\sin(\gamma_{PLL}+\omega_{PLL}*\Delta t), \text{ and}$$

$$V_{\beta\_Model} = V_{Mag}*\cos(\gamma_{PLL}+\omega_{PLL}*\Delta t),$$

wherein $V_{Mag}$ is the amplitude of $V_\alpha$ and $V_\beta$, $\gamma_{PLL}$ is a controller generated angle, and $\omega_{PLL}*\Delta t$ represents a phase advance of one controller sampling time at the last calculated frequency of the controller.

14. The controller of claim 9, wherein said first determining means determines whether a bridge firing has been commanded with five sampling periods.

15. The controller of claim 14, wherein five sampling periods is approximately 1250 μs.

16. A controller for regulating the firing of a thyristor bridge comprising:
a plurality of inputs for receiving a plurality of line to line voltage signals;
a two-phase phase locked loop electrically connected to said plurality of inputs,
wherein said two-phase phase locked loop converts said plurality of line to line voltage signals into orthogonal signals $V_\alpha$ and $V_\beta$,
wherein said two-phase phase locked loop further generates model signals $V_{\alpha\_Model}$ and $V_{\beta\_Model}$, wherein $V_{\alpha\_Model}$ and $V_{\beta\_Model}$ are calculated based upon the following expressions:

$$V_{\alpha\_Model} = V_{Mag} * \sin(\gamma_{PLL} + \gamma_{PLL} * \Delta t), \text{ and}$$

$$V_{\beta\_Model} = V_{Mag} * \cos(\gamma_{PLL} + \gamma_{PLL} * \Delta t),$$

wherein $V_{Mag}$ is the amplitude of $V_\alpha$ and $V_\beta$, $\gamma_{PLL}$ is a controller generated angle, and $\omega_{PLL} * \Delta t$ represents a phase advance of one controller sampling time at the last calculated frequency of the controller;

first determining means for determining whether a bridge firing has been recently commanded;

second determining means for determining whether $|(V_\alpha - V_{\alpha\_Model})|$ and $|(V_\beta - V_{\beta\_Model})|$ are each greater than a predetermined value if it is determined by said first determining means that a bridge firing has been recently commanded;

generating means for generating a phase error signal based upon $V_\alpha$ and $V_\beta$ if it is determined by said first and second determining means that either a bridge firing has not been recently commanded or that $|(V_\alpha - V_{\alpha\_Model})|$ and $|(V_\beta - V_{\beta\_Model})|$ are not greater than said predetermined value;

wherein said generating means generate a compensated phase error signal based upon $V_{\alpha\_Model}$ if it is determined by said second determining means that $|(V_\alpha - V_{\alpha\_Model})|$ is greater than said predetermined value, and wherein said generating means generate said compensated phase error signal based upon $V_{\beta\_Model}$ if it is determined by said second determining means that $|(V_\beta - V_{\beta\_Model})|$ is greater than said predetermined value.

\* \* \* \* \*